INVENTOR.
SHELBY R. BIGDEN
BY Baldwin & Wight
ATTORNEYS

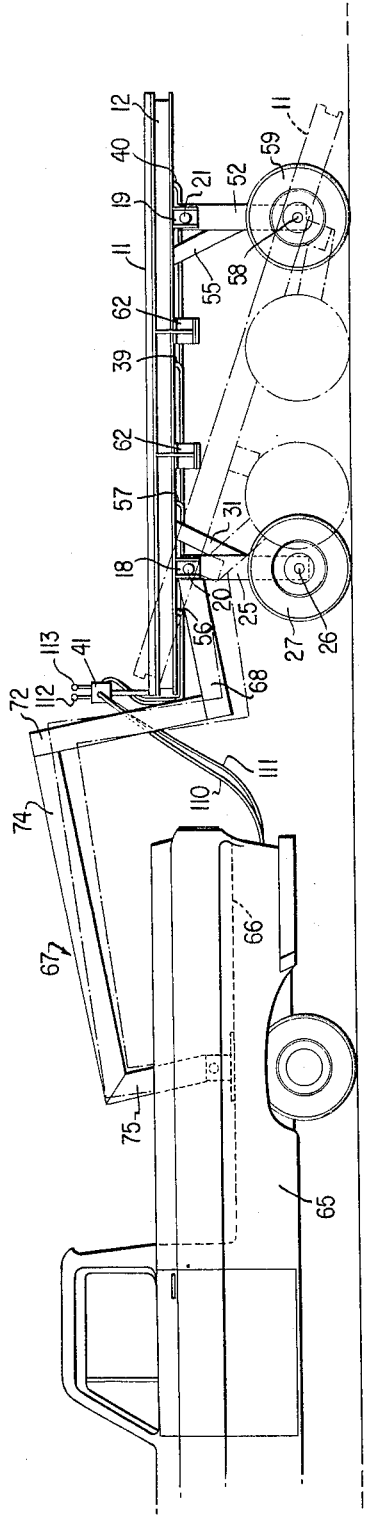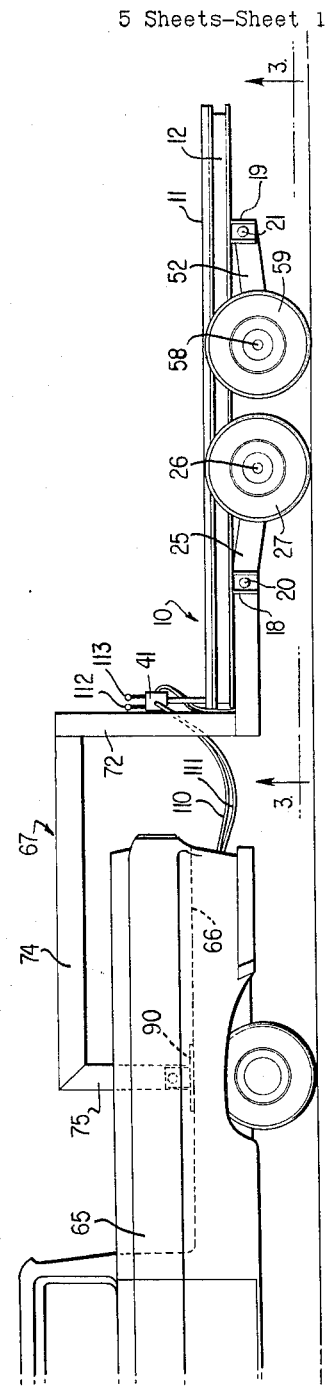

Nov. 29, 1966   S. R. BIGDEN   3,288,315
TILT-LIFT TRAILER

Filed July 13, 1964   5 Sheets-Sheet 3

INVENTOR.
SHELBY R. BIGDEN
BY *Baldwin & Wight*
ATTORNEYS

Nov. 29, 1966   S. R. BIGDEN   3,288,315
TILT-LIFT TRAILER

Filed July 13, 1964   5 Sheets-Sheet 4

INVENTOR.
SHELBY R. BIGDEN
BY *Baldwin & Wight*
ATTORNEYS

Nov. 29, 1966   S. R. BIGDEN   3,288,315
TILT-LIFT TRAILER
Filed July 13, 1964   5 Sheets-Sheet 5
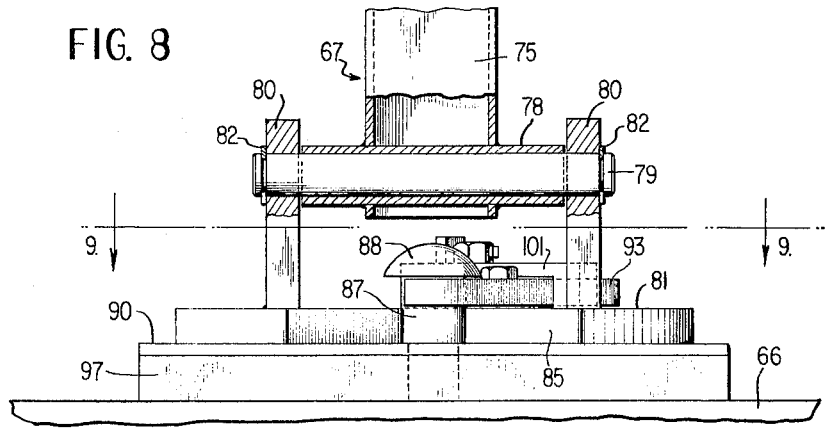
FIG. 8
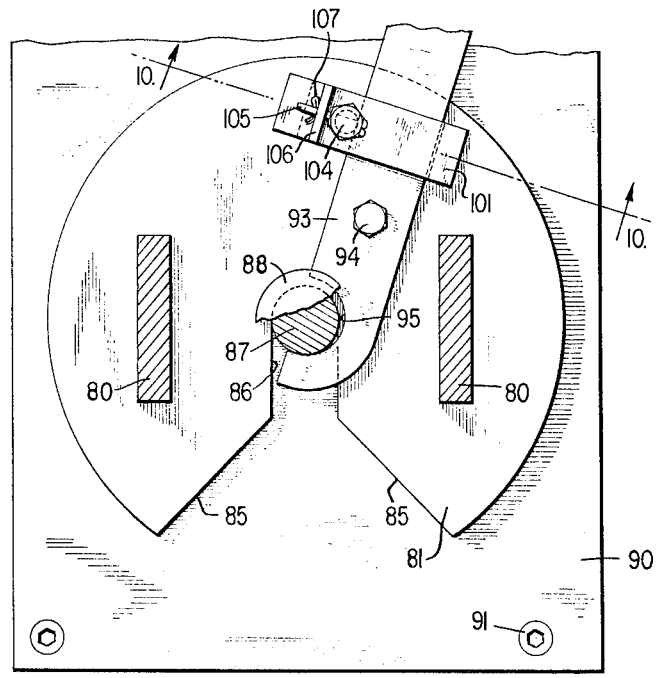
FIG. 9
FIG. 10
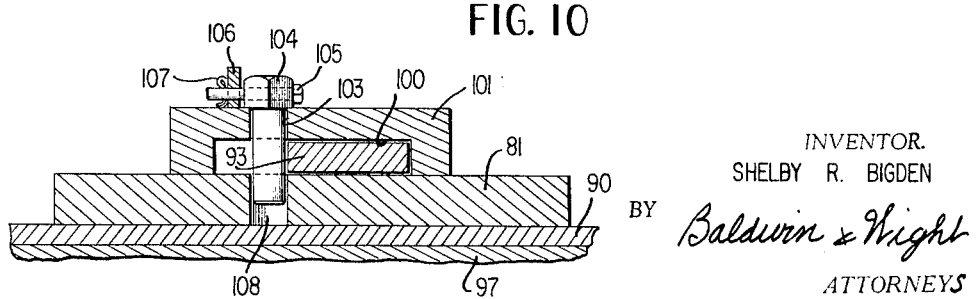
INVENTOR.
SHELBY R. BIGDEN
BY Baldwin & Wright
ATTORNEYS

# United States Patent Office 3,288,315
Patented Nov. 29, 1966

3,288,315
TILT-LIFT TRAILER
Shelby R. Bigden, Waco, Tex., assignor to
Ruble Langston, Bryan, Tex.
Filed July 13, 1964. Ser. No. 381,956
14 Claims. (Cl. 214—506)

This invention relates to a trailer construction and has particular reference to a trailer adapted to be subject to adjustments as to height, etc. according to the use to which the trailer is to be put.

An important object of the invention is to provide a trailer the bottom or body of which may be lowered in close proximity to the ground to facilitate loading of the trailer, and which may be elevated to a substantially higher position to facilitate loading and unloading with respect to a dock or platform.

A further object is to provide a novel arrangement of hydraulic rams for varying the height of the bed of the trailer under the easy control of the operator.

A further object is to provide a novel arrangement of hydraulic rams, one for the front wheels and the other for the rear wheels of the trailer, and simultaneously operable to raise or lower the bed of the trailer while maintaining such bed substantially horizontal to place the bed at a convenient level according to the use to which the trailer is to be put.

A further object is to provide independently operable hydraulic rams for the front and rear wheels of the trailer whereby either end of the trailer bed may be raised or lowered independently of the other end whereby the trailer bed slopes, for example, downwardly toward the rear end of the trailer, to facilitate the loading and unloading of heavy articles to and from the bed.

A further object is to provide a trailer of the type referred to having a novel type of hitch frame for connecting it to the bed of the towing truck.

Other objects and advantages of the invention will become apparent during the course of the following description.

In the drawings I have shown one embodiment of the invention. In this showing

FIGURE 1 is a side elevation of the trailer, the hitch therefor and a portion of the towing truck showing the trailer bed in solid lines in its elevated horizontal position, a sloping position of the trailer bed being shown in broken lines;

FIGURE 2 is a similar view showing the trailer bed in its lowermost horizontal position;

FIGURE 8 is an enlarged transverse sectional view through the center of the forward hitch connection to the truck;

FIGURE 9 is a sectional view on line 9—9 of FIGURE 8, and

FIGURE 10 is an enlarged fragmentary sectional view on line 10—10 of FIGURE 9.

Figure 3:
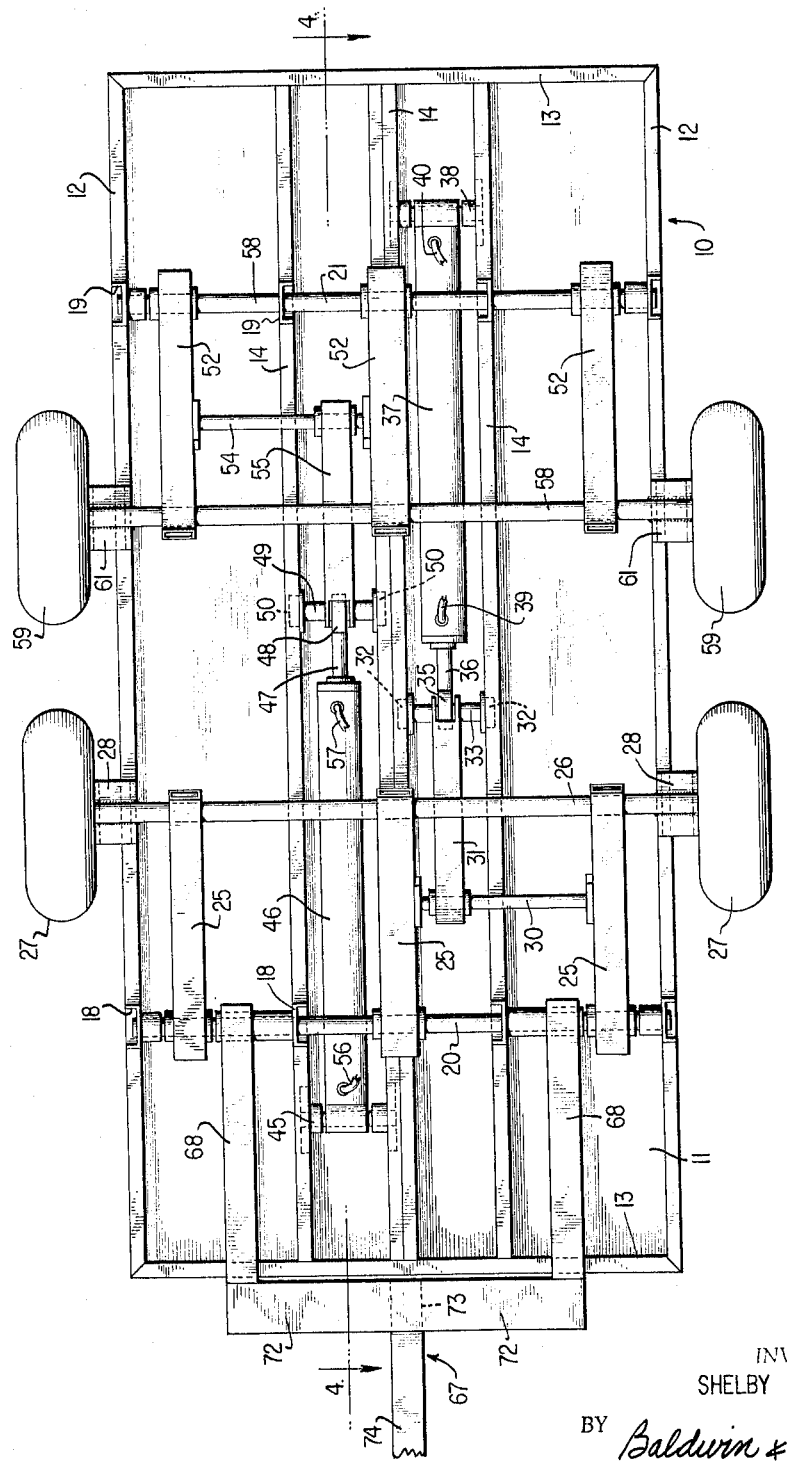
FIGURE 3 is a bottom plan view of the trailer looking upwardly, for example, from the line 3—3 in FIGURE 2.

Referring to FIGURES 1 to 6, inclusive, the numeral 10 designates the trailer as a whole shown in the present instance as having a flat bed 11 supported on a main frame comprising longitudinal parallel side frame members 12 and transverse similar frame members 13. On opposite sides of the longitudinal center of the trailer are two pairs of longitudinal frame members 14, which in addition to serving to support the bed 10, perform an additional function referred to below. The elements described comprise the body of the trailer.

Forward and rear sets of depending hangers 18 and 19 are adapted to support forward and rear shafts 20 and 21. Each set of hangers is four in number and these hangers are fixed to the side frames 12 and to the longitudinal frame members 14, thus providing adequate support for the shafts 20 and 21. To the shaft 20 is connected one end of each of a plurality of arms or struts 25. Three of these struts are shown, one toward each end of the shaft 20 and the other centrally thereof. The other ends of these struts carry a transverse axle 26 on each end of which is mounted a preferably rubber-tired ground wheel 27. Preferably welded to the axle 26 adjacent each wheel 27 is a supporting shoe 28. As will become apparent below, these shoes are tilted substantially from the horizontal (FIGURE 5) when the bed 10 is raised, as described below, and are substantially horizontal (FIGURE 4) when the bed 11 is in its lower position.

The center strut 25 (FIGURE 6) and one of the side struts 25 are connected by a shaft 30 and a connecting link 31 is pivoted at one end to the shaft 30.

Figure 6:
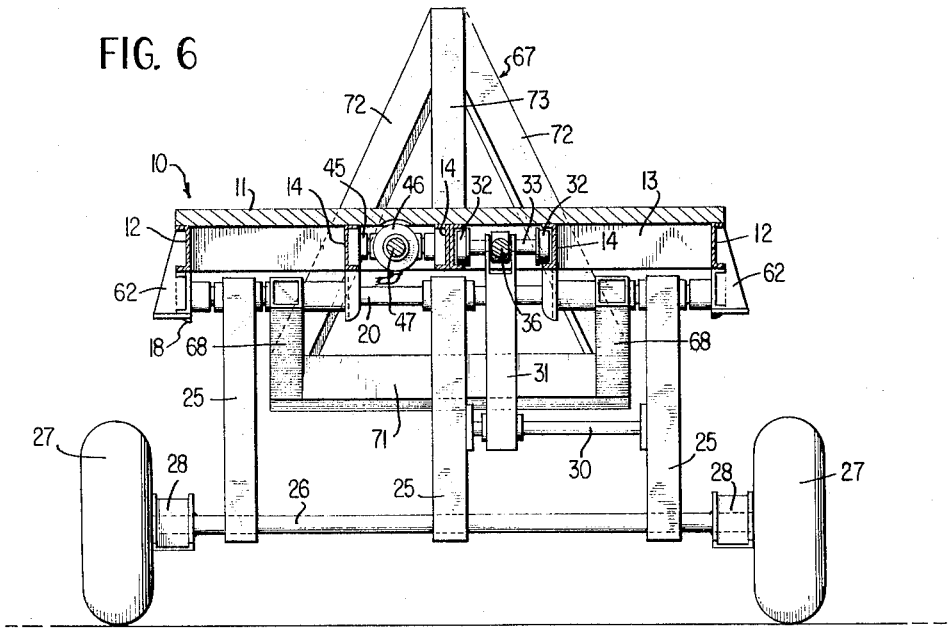
FIGURE 6 is a transverse sectional view on line 6—6 of FIGURE 5.

The pairs of frame members 14 are arranged as shown in section in FIGURE 6, the members of each pair opening toward each other to form trackways. The right-hand pair of such trackways in FIGURE 6 receive wheels 32 mounted on a cross shaft 33 and the other end of the arm 31 is pivoted on the shaft 33. Also pivoted on the shaft 33 is a bearing 35 carried by the piston rod 36 of a hydraulic ram 37, the opposite end of which is pivoted as at 38 to the same pair of frame members 14. The ram 37 is a conventional double-acting ram and the ends of the ram are connected respectively to hoses 39 and 40 leading to a control valve mechanism 41 (FIGURE 1) to be referred to below.

The other pair of frame members 14, that is, the left-hand pair in FIGURE 6 and the upper pair as viewed in FIGURE 3, pivotally support as at 45 a ram 46, similar to the ram 37, provided with a piston (not shown) having a rod 47 provided with a bearing 48 at its end pivoted on a shaft 49 having wheels 50 operable in the trackways provided by the associated frame members 14.

Struts 52, corresponding to the struts 25 described previously and similarly arranged, each has one end pivoted to the transverse shaft 21 (FIGURE 3) supported in the hangers 19 previously described. Two of the struts 52, as shown in FIGURE 3, are connected to each other intermediate their ends by the shaft 54. The shaft 54 is pivotally connected to one end of a link 55 having its other end pivotally connected to the shaft 49. As is true of the ram 37, the ram 46 also is double-acting and has its ends connected respectively to hoses 56 and 57, also leading to the control valve mechanism 41.

The other ends of the struts 52 are connected to a rear axle 58, the ends of which also carry preferably rubber-tired ground wheels 59. As is true of the axle 26, the axle 58 is provided with supporting shoes 61 (FIGURE 3) which are substantially horizontal when the trailer bed 10 is in its lowermost position. The frame members 12 are provided with abutments 62 welded or otherwise rigidly connected thereto and depending therefrom as shown in FIGURE 1. These abutments obviously are arranged in forward and rear pairs and each is so positioned that when the trailer bed 11 is lowered, they will engage directly against the shoes 28 and 61 so that the load of the trailer and the articles carried thereby will be directly supported on the axles 26 and 58.

Figure 7:
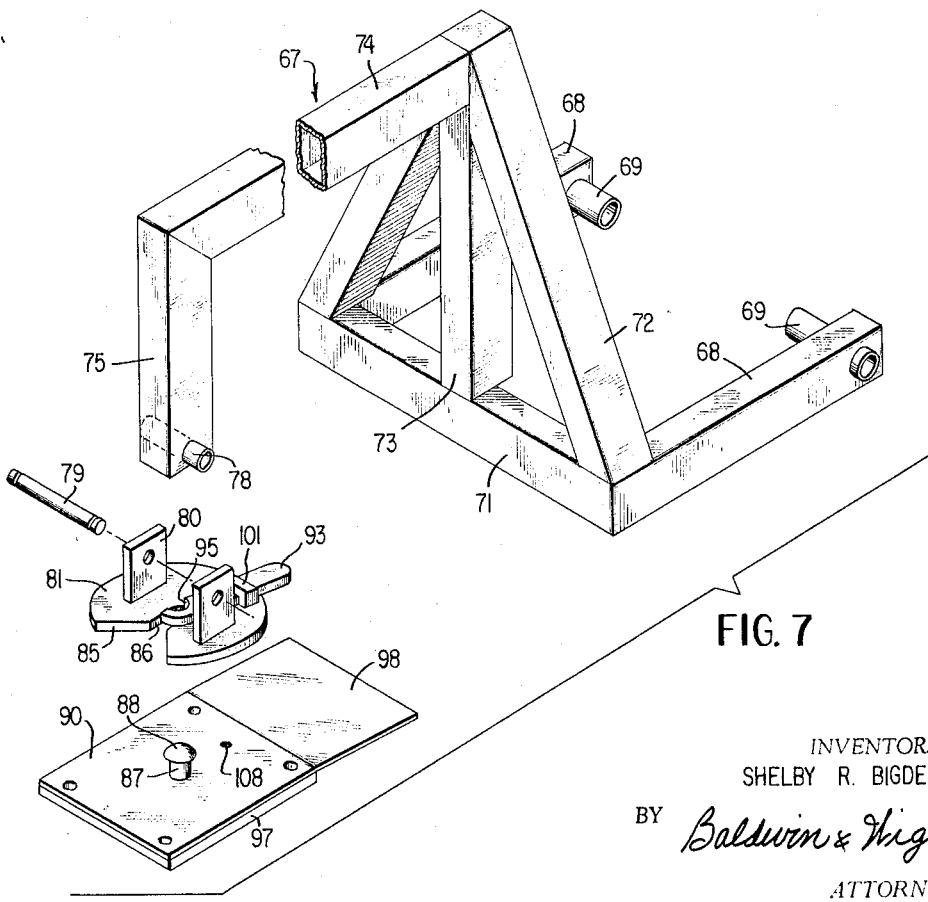
FIGURE 7 is a detail exploded perspective view of the hitch and the connecting means between the forward end of the hitch and the truck body, a portion of the hitch being broken away.

The trailer is adapted to be towed by a vehicle 65, shown in the present instance as being an open truck, the body of which is provided with a bed 66. A hitch indicated as a whole by the numeral 67 is adapted to connect the trailer in towing relation to the truck. This hitch (FIGURE 7) is provided with two rear spaced parallel arms 68 each of which carries at its rear end a bearing 69 surrounding the shaft 20 so that towing forces are applied to the latter shaft beneath and in close proximity to the body 11. At their forward ends, the arms 68 are connected by a cross member 71 welded or otherwise secured to the lower ends of upwardly and inwardly inclined arms 72. The upper ends of these arms are welded to a vertical support 73 connected at its lower end to the cross member 71 and also welded to a forwardly extending arm 74 having a downturned forward end 75. Through the pivotal connection of the hitch 67 to the shaft 20, the trailer body is adapted to move upwardly and downwardly with the hitch 67 free to assume different angular positions as shown in FIGURES 1 and 2.

The forward end of the hitch is connected to the bed of the truck so as to swing on a horizontal axis so that the hitch can alter its angular positions as shown in FIGURES 1 and 2, and the forward end of the hitch also swings on a vertical axis, as is necessary when the trailer is towed around curves. The lower end of the arm 75 (FIGURES 7 and 8) is provided with a tubular member 78 through which extends a shaft 79 forming the horizontal pivotal support for the hitch 67. The ends of the shaft 79 are mounted in upstanding arms 80 integral with or rigidly carried by a horizontal plate 81, the shaft 79 being fixed against endwise movement, for example, by snap rings 82.

The plate 81 is provided with a V-shaped opening 85 connected to a parallel-sided slot 86 receiving a vertical pivot pin 87 headed as at 88. The pin 87 is carried by a plate 90 attached as at 91 to the bed 66 of the truck. The inner limit of the slot 86 is semi-circular to fit the pin 87 and forms a half bearing therefor, and means is provided for locking the pin 87 in the slot 86. A latch bar 93 is pivoted as at 94 to the plate 81 and has a substantially circular notch 95 in one edge thereof extending around the pin 87 to prevent displacement thereof from the slot 86. The plate 90 may be directly connected to the bed of the truck, or it may be made relatively thin and supported on the truck bed by a shim plate 97 with the plate 90 extended rearwardly and downwardly as at 98 to form a ramp end over which the plate 81 is adapted to slide in attaching the device to the pin 87. This operation is performed, of course, with the latch bar 93 in released position as described below.

The rear end of the latch bar 93 extends through a guide opening 100 in a guide plate 101, the opening 100 being of sufficient length transversely of the latch bar to permit the rear end of the latter to swing to the left in FIGURE 9 to release the notch 95 from the pin 87.

The top of the guide 101 is apertured as at 103 to slidably receive a headed pin 104 which, when operatively positioned as in FIGURE 10, prevents unlatching movement of the latch bar 103. The pin 104, in turn, is provided with a small slidable pin 105 adapted to extend through an upstanding flange 106 carried by the guide 101, the pin 105 being maintained in position in any suitable manner, for example, by a cotter pin 107. The lower end of the pin 104 engages in an opening 108 in the plate 81.

Either the trailer or truck, and preferably the latter, is provided with a conventional source of hydraulic pressure (not shown). If the truck is provided with the pressure source, feed and return lines 110 and 111 (FIGURE 1) are connected to the valve mechanism 41. This valve mechanism forms per se no part of the present invention and is provided with valve elements controlled by handles 112 and 113 operative for controlling the supply of hydraulic fluid to and returning it from the respective rams 37 and 46.

OPERATION

When the trailer is to be connected to the truck 65, the arm 74 is elevated so that the plate 81, connected to the arm 75, will be free to slide over the bed of the truck. The truck is backed up and the plate 81 (FIGURES 7 and 9) slides over the plate portion 98 and the wide mouth of the slot 86 guides the pin 87 into the slot 86. Of course, the latch bar 93 will be released and the locking end will be swung to the right of the position shown in FIGURE 9. When the pin 87 is positioned in the closed end of the slot 86, the latch bar 93 is swung to the locking position, the pin 104 is inserted through the openings 103 and 108 and the retaining pin 105 is inserted in position and fixed by the cotter pin 107. The trailer is now hitched to the truck to be towed thereby.

Assuming that the trailer bed is in its lowermost position for the loading and unloading of articles close to the ground, the parts will be in the positions shown in FIGURE 2. If the trailer is hauled to a platform or dock elevated above the ground level and it is desired to facilitate the transfer of articles from the trailer to the dock or platform, the valve handles 112 and 113 will be manipulated to supply hydraulic fluid to the ram 37 through hose 40 and to the ram 46 through a hose 56. Under such conditions, the piston rod 36 (FIGURE 3) will move forwardly and the piston rod 47 rearwardly. The piston rod 36 transmits forward movement to the shaft 33, the wheels 32 rolling in the channels of the adjacent members 14. A thrust will be applied to the adjacent end of the link 31 and through the shaft 30 to the struts 25 to swing the struts downwardly from the position shown in FIGURE 4 to that shown in FIGURE 5, the wheels 27 thus being moved relatively downwardly and the trailer bed 11 upwardly. At the same time, the ram 46 will apply similar force to the shaft 49, link 55 and shaft 54 to the struts 52 to swing the latter downwardly from the position shown in FIGURE 4 to that shown in FIGURE 5. All struts 25 and 52 will now be vertically arranged and the trailer bed 11 will be in its uppermost horizontal position to facilitate loading or unloading, as the case may be.

Figure 4:
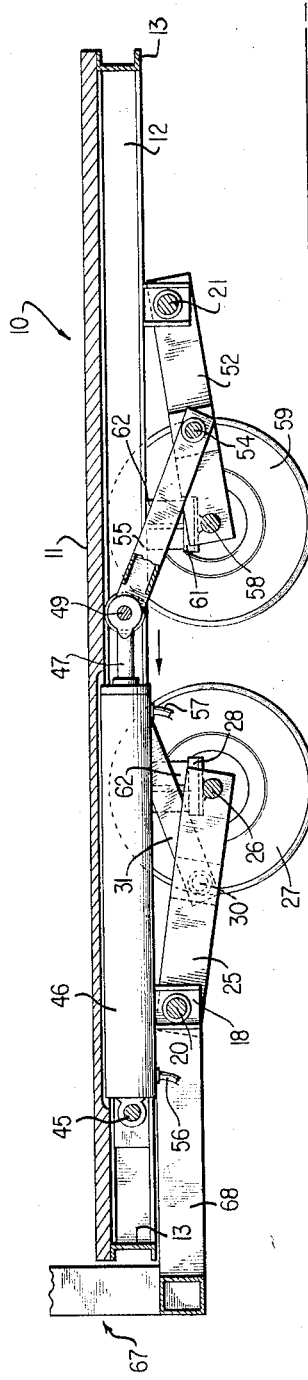
FIGURE 4 is a vertical longitudinal sectional view on line 4—4 of FIGURE 3 showing the trailer bed in its lowermost horizontal position.
Figure 5:
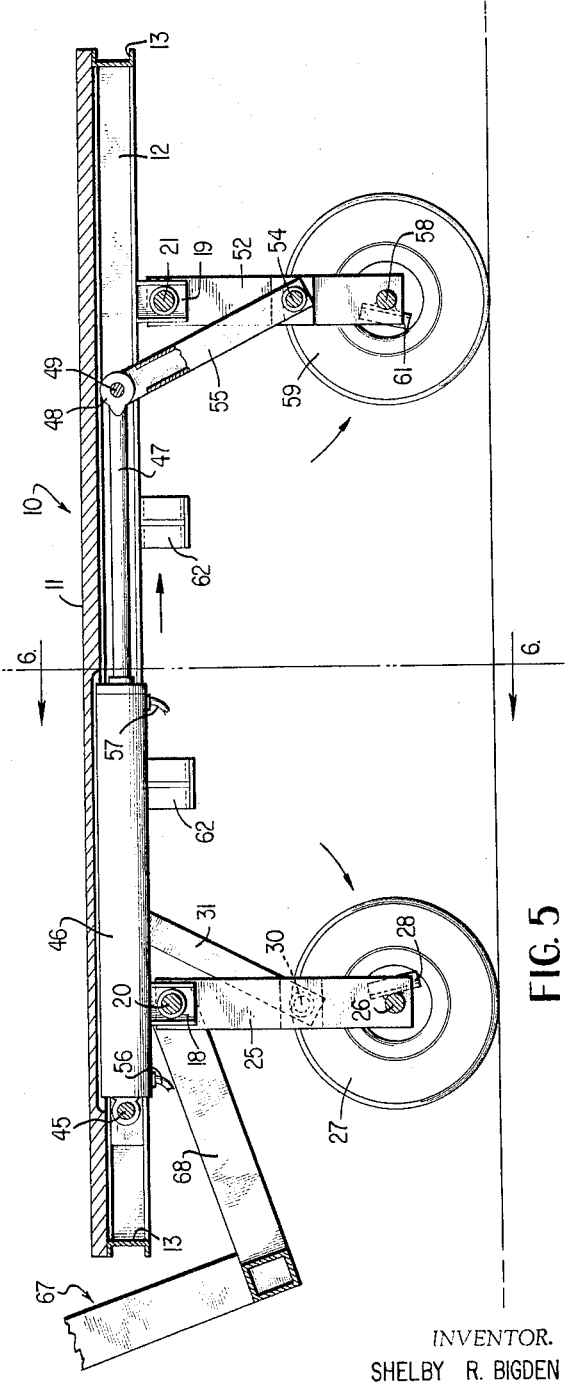
FIGURE 5 is a similar view showing the trailer bed in its uppermost horizontal position.

When it is desired to again lower the trailer bed 11, operation of the valve handles 112 and 113 will be reversed to supply hydraulic fluid to the ram 37 through hose 39 and to the ram 46 through hose 57, thus retracting the ram pistons to reverse the operation of the struts 25 to return them from the positions shown in FIGURE 5 to the positions shown in FIGURE 4. Any intermediate position of the trailer body between the uppermost and lowermost positions may be accomplished by properly controlling the valve handles 112 and 113 to supply the necessary hydraulic fluid to the rams and then placing the handles 112 and 113 in neutral positions, the ram pistons then being locked by the hydraulic pressure therein. In some cases, it will be desirable to lower one end of the trailer bed, as shown in broken lines in FIGURE 1, to facilitate the loading of heavy articles thereon. If, at such time, the trailer bed is in its uppermost position shown in FIGURE 1, hydraulic pressure may be supplied to the rear or right-hand end of the ram 46, in which case the struts 52 will be moved to the position shown in FIGURE 4 and the trailer bed will assume the downwardly and rearwardly inclined position shown. If the trailer bed is to be sloped starting from the lowermost position of the trailer bed position shown in FIGURE 2, hydraulic pressure will be supplied through the hose 40 (FIGURE 3) to operate the ram 37 and swing the struts 25 to vertical positions, in which case the trailer bed 11 will be sloped as shown in broken lines in FIGURE 1.

It will be apparent that in moving between upper and lower positions, movement will be transmitted to the shaft 20, and the rear end of the hitch 67 is free to turn about the axis of such shaft. Similarly, the forward end of the hitch is adapted to swing on the axis of the pin 79. In driving the truck-trailer combination, the hitch is free to swing about the axis of the kingpin 87 in turning corners, as will be apparent.

Attention is also invited to the fact that the truck-trailer combination is preferably driven between loading and unloading points with the trailer body lowered as in FIGURE 2, to lower the center of gravity of the load thereon. Under such conditions, the abutments 62 will directly engage the shoes 28 and 61, and accordingly, the entire load of the trailer body and the articles thereon will be supported by the axles 26 and 58.

From the foregoing it will be apparent that the present construction is relatively simple, compact and easily operable and controlled to position the trailer body as desired, either in its upper or lower positions arranged horizontally, or horizontally in intermediate positions, or in an inclined position as shown in broken lines in FIGURE 1. The hitch 67 is free to turn on horizontal axes at its forward and rear ends and to turn on a vertical axis when the vehicles are turning corners.

It also will be noted that the frame structure of the trailer will be extremely rigid for the carrying of heavy loads, and the four frame members 14 are utilized as tracks for the rollers 32 and 50 to guide the piston rods of the rams for linear movement and to absorb upward thrusts of the links 31 and 55 against the shafts 33 and 49. Attention also is invited to the fact that both rams are horizontally arranged directly beneath the trailer bed where they are not only substantially invisible, but are effectively protected from damage of any kind. Also, in traveling with the trailer bed in its lowermost position, no loads can be transmitted to the struts 25 or 52 or links 31 and 55, the entire load being supported directly on the trailer axles.

It is to be understood that the form of the invention shown and described is to be taken as a preferred example of the same, and that various changes in the shape, size and arrangement of the parts may be made as do not depart from the spirit of the invention or the scope of the appended claims.

I claim:

1. A trailer comprising a body, forward and rear axles and ground wheels carried by each axle, a set of struts directly pivotally connected at one end to and forming the sole supporting means for each axle and connected at the other end to said body, a pair of oppositely facing horizontal rams beneath said body for independently controlling the angular position of each set of struts, and force-transmitting means connected between each ram and the associated set of struts between the ends thereof whereby operation of each ram will swing the associated set of struts to vary the angular position thereof to adjust the height of the associated end of said body relative to the other end.

2. A trailer comprising a body, forward and rear axles and ground wheels carried by each axle, a set of struts directly pivotally connected at one end to and forming the sole supporting means for each axle and connected at the other end to said body, a pair of horizontal rams beneath said body for independently controlling the angular position of each set of struts, each ram having a piston rod, and a link connected at one end to each piston rod and having mechanical connection at its other end with the associated set of struts between the ends thereof whereby operation of each ram will swing the associated set of struts to vary the angular position thereof to adjust the height of the associated end of said body relative to the other end.

3. A trailer comprising a body including a flat bed and longitudinal and transverse frame members therebeneath supporting said bed, forward and rear axles and ground wheels carried by each axle, a set of struts directly pivotally connected at one end to and forming the sole supporting means for each axle and connected at the other end to said body, a pair of oppositely facing horizontal rams beneath said bed between certain of said longitudinal frame members for independently controlling the angular position of each set of struts, and force-transmitting means connected between each ram and the associated set of struts between the ends thereof whereby operation of each ram will swing the associated set of struts to vary the angular position thereof to adjust the height of the associated end of said body relative to the other end.

4. A trailer comprising a body including a flat bed and longitudinal and transverse frame members therebeneath supporting said bed, forward and rear axles and ground wheels carried by each axle, a set of struts directly pivotally connected at one end to and forming the sole supporting means for each axle and connected at the other end to said body, a pair of horizontal rams beneath said bed between certain of said longitudinal frame members for independently controlling the angular position of each set of struts, each ram having a piston rod, and a link pivotally connected at one end to each piston rod and having mechanical connection at its other end with the associated set of struts intermediate the ends thereby whereby operation of each ram will swing the associated set of struts to vary the angular position thereof to adjust the height of the associated end of said body relative to the other end.

5. A trailer comprising a body including a flat bed and longitudinal and transverse frame members beneath and supporting said bed, forward and rear axles and ground wheels carried by each axle, a set of struts directly pivotally connected at one end to and forming the sole supporting means for each axle and connected at the other end to said body, a ram for independently controlling the angular position of each set of struts, each ram being horizontal and arranged oppositely beneath said bed and between and connected to certain of said horizontal frame members, and force-transmitting means connected between each ram and the associated set of struts between the ends thereof whereby operation of each ram will swing the associated set of struts to vary the angular position thereof to adjust the height of the associated end of said body relative to the other end.

6. A trailer comprising a body including a flat bed and longitudinal and transverse frame members beneath and supporting said bed, forward and rear axles and ground wheels carried by each axle, a set of struts directly pivotally connected at one end to and forming the sole supporting means for each axle and connected at the other end to said body, a ram for independently controlling the angular position of each set of struts, each ram being horizontal and arranged oppositely beneath said bed and between and connected to certain of said horizontal frame members, each ram having a piston rod, and a link pivotally connected at one end to each piston rod and having its other end in pivotal mechanical connection with the associated set of struts on an axis intermediate the ends thereof whereby operation of each ram will swing the associated set of struts to vary the angular position thereof to adjust the height of the associated end of said body relative to the other end.

7. A trailer comprising a body including a flat bed and longitudinal and transverse frame members therebeneath supporting said body, forward and rear axles and ground wheels carried by each axle, two pairs of said longitudinal frame members being parallel and spaced inwardly from the sides of said body and each such pair forming guides, a set of struts pivotally connected at one end to each axle and at the other end to said body, a ram arranged between the frame members of each of said pairs and connected at one end thereto, each ram having a piston rod, a transverse shaft pivoted to each piston rod and having wheels at its ends engaging in the associated guides, and force-transmitting means connected between each shaft and the associated set of struts whereby operation of each ram will swing the associated set of struts to vary the angular position thereof to adjust the height of the associated end of said body.

8. A trailer comprising a body including a flat bed and longitudinal and transverse frame members therebeneath supporting said body, forward and rear axles and ground wheels carried by each axle, two pairs of said longitudinal frame members being parallel and spaced inwardly from the sides of said body and each such pair forming guides, a set of struts pivotally connected at one end to each axle and at the other end to said body, a ram arranged between the frame members of each of said pairs and connected at one end thereto, each ram having a piston rod, a transverse shaft pivoted to each piston rod and having wheels at its ends engaging in the associated guides, and a link connected at one end to each of said shafts and having mechanical connection at its other end to the associated set of struts whereby operation of each ram will swing the associated set of struts to vary the angular position thereof to adjust the height of the associated end of said body.

9. A trailer according to claim 8 wherein each set of struts comprises three parallel struts, two of which are arranged adjacent the sides of the truck and the other of which is arranged centrally of the width thereof, a force-transmitting shaft connected between the center strut of one pair and the associated side strut adjacent one side of said body, a force-transmitting shaft connected between the other center strut and the associated strut adjacent the other side of said body, and a link connected at one end to each of said first-named shafts and at its other end to the associated force-transmitting shaft whereby operation of each ram will swing the associated set of struts to vary the angular position thereof to adjust the height of the associated end of said body.

10. A trailer according to claim 9 wherein said pairs of frame members are channel members, the channels of the frame members of each pair opening toward each other to form said tracks.

11. A trailer according to claim 9 wherein said pairs of frame members are channel members, the channels of the frame members of each pair opening toward each other to form said tracks, the end of each ram opposite its piston rod being pivotally connected to the longitudinal frame members of the associated pair.

12. A trailer comprising a body including a flat bed and frame members beneath and supporting said bed, forward and rear axles and ground wheels carried by each axle, a set of struts pivotally connected at one end to each axle and at the other end to said body, a ram for controlling the angular position of the struts of each set, force-transmitting means connected between each ram and the associated set of struts whereby operation of each ram will swing the associated set of struts to vary the angular position thereof to adjust the height of the associated end of said body, and load-supporting elements carried respectively by said body and said axle for limiting the downward movement of said body relative to said axles whereby, when said body is in its lowermost position, said elements transmit all body loads directly to said axles.

13. A trailer according to claim 12 wherein said frame members include parallel longitudinal frame members adjacent the longitudinal edges of said body, said load-supporting elements comprising forward and rear abutments carried by said longitudinal frame members and spaced apart a distance equal to the spacing of said forward and rear axles when said body is in its lowermost position, and supporting shoes carried by each axle each positioned to engage one of said abutments when said body is lowered to its lowermost position to transmit body loads directly to said axles.

14. In combination, a truck, a trailer comprising a body having a flat bed and longitiudinal and transverse frame members beneath and secured to said bed, forward and rear axles and ground wheels carried by each axle, a set of struts pivotally connected at one end to each axle, forward and rear horizontal shafts beneath said trailer body and secured to certain of said frame members in close proximity thereto, the other ends of the struts of each set being pivotally connected to one of said shafts, a horizontal ram beneath said bed for controlling the angular position of each set of struts and force-transmitting means connected between each ram and the associated set of struts whereby operation of each ram will swing the associated set of struts to vary the angular position thereof to adjust the height of the associated end of said body, and a hitch having a forward end universally pivoted to the truck and having a rear end formed of spaced arms pivotally connected to said forward shaft.

References Cited by the Examiner
UNITED STATES PATENTS

| | | |
|---|---|---|
| 1,257,169 | 2/1918 | Yarbrough. |
| 2,471,901 | 5/1949 | Ross. |
| 3,145,865 | 8/1964 | Rogers _____ 214—512 |

References Cited by the Applicant
UNITED STATES PATENTS

| | | |
|---|---|---|
| 2,297,992 | 10/1942 | Swim. |
| 2,780,475 | 2/1957 | Koerner. |
| 2,806,710 | 9/1957 | Mascaro. |
| 2,974,972 | 3/1961 | Hassell. |
| 3,091,476 | 5/1963 | Blake. |

GERALD M. FORLENZA, *Primary Examiner.*

ALBERT J. MAKAY, *Examiner.*